(12) United States Patent
Hove et al.

(10) Patent No.: US 6,695,557 B2
(45) Date of Patent: Feb. 24, 2004

(54) WHEEL LUG NUT SECURITY SEAL

(76) Inventors: John Hove, 4012 Turnberry Ct., Jacksonville, FL (US) 32226; Jim Nelson, 10500 C.R. 13 North, St. Augustine, FL (US) 32092

( * ) Notice: Subject to any disclaimer, the term of this patent is extended or adjusted under 35 U.S.C. 154(b) by 0 days.

(21) Appl. No.: 10/231,211

(22) Filed: Aug. 30, 2002

(65) Prior Publication Data

US 2003/0044258 A1 Mar. 6, 2003

Related U.S. Application Data

(60) Provisional application No. 60/316,937, filed on Sep. 5, 2001.

(51) Int. Cl.[7] ............................................. F16B 41/00
(52) U.S. Cl. ........................ 411/429; 411/910; 411/5; 411/377; 292/307 B
(58) Field of Search .................... 411/2, 3, 5, 910, 411/429, 431, 432, 372.5, 372.6, 373, 7, 120, 240, 234, 235, 374, 377; 70/229; 292/307 A, 307 B, 327

(56) References Cited

U.S. PATENT DOCUMENTS

| | | | | |
|---|---|---|---|---|
| 4,302,137 A | * | 11/1981 | Hart | 411/432 |
| 4,324,516 A | | 4/1982 | Sain et al. | |
| 4,521,146 A | * | 6/1985 | Wharton | 411/1 |
| 4,645,397 A | | 2/1987 | Howe | |
| 4,659,273 A | * | 4/1987 | Dudley | 411/373 |
| 4,726,723 A | * | 2/1988 | Bainbridge | 411/432 |
| 5,205,616 A | * | 4/1993 | Wright | 301/37.374 |
| 5,350,266 A | * | 9/1994 | Espey et al. | 411/431 |
| 5,752,794 A | * | 5/1998 | Krawczak | 411/374 |
| 6,039,408 A | * | 3/2000 | Alvarez | 301/35.623 |
| 6,053,681 A | * | 4/2000 | Mattershead | 411/195 |

* cited by examiner

Primary Examiner—Flemming Saether
Assistant Examiner—Jori Schiffman
(74) Attorney, Agent, or Firm—Browdy and Neimark, P.L.L.C.

(57) ABSTRACT

A security seal assembly is designed to provide detection of tampering with or the removal of a wheel lug nut, particularly on a truck tire. The Security Seal is designed as an indicative seal rather than theft seal. When the seal is fitted onto the wheel lug nut, it prohibits access to the nut unless the cover is broken.

13 Claims, 3 Drawing Sheets

WHEEL LUG NUT SECURITY SEAL

CROSS-REFERENCE TO RELATED APPLICATION

The present application claims the benefit of U.S. Provisional Appln. No. 60/316,937, filed Sep. 5, 2001.

BACKGROUND OF THE INVENTION

1. Technical Field of the Invention

The present invention is directed to a security seal assembly designed to provide detection of tampering with or the removal of a wheel lug nut, particularly on a truck tire. The security seal is designed as an indicative seal rather than theft seal. When the seal is fitted onto the wheel lug nut, it prohibits access to the nut unless the cover is broken.

2. Prior Art

U.S. Pat. Nos. 4,324,516 and 4,645,397 are inventions with the same purpose but of different design. Both these designs can be removed undamaged and re-fitted without detection if certain conditions apply when the seal is originally fitted.

There are several security seals for vehicle wheels, particularly trucks, on the market and the security seal has been in use for more than 15 years. Security seals for wheel lug nuts are basically either a lock seal or an indicative seal. The lock seal is design to prevent removing the lug nut unless some special tool is used. This seal can often be reused and is therefore expensive to manufacture. The indicative seal is however inexpensive and designed to be a one time use only, once it is fitted it cannot be removed unless it is broken. The idea is that a broken or missing indicative seal is easy to detect by a quick visual inspection and this will then initiate an investigation by the equipment owner of unauthorized removal and replacement of a wheel or tire from a vehicle while in the care of a third party, domestically or abroad.

Prior art designs of the indicative seal have however not proven to be effective. Under some circumstances such as a short lug nut, they can be removed intact and refitted without detection when inspected. Some designs have also proven to be difficult to fit properly, resulting in fitted seals that can be removed without detection.

OBJECT OF THE INVENTION

The primary object of the invention is directed to providing an indicative seal that eliminates the problems of the prior art indicative seal devices but remains simple and economical to manufacture and use.

DETAILED DESCRIPTION OF THE PREFERRED EMBODIMENT(S) OF THE INVENTION

Figure 1:
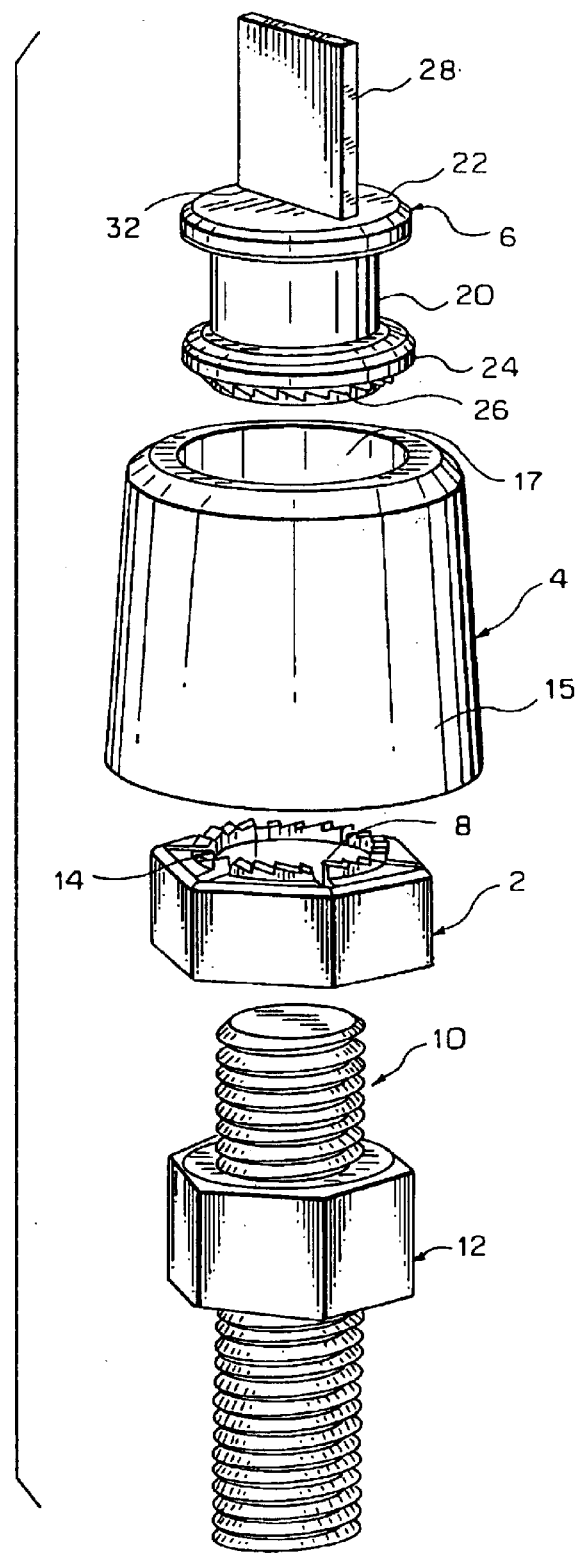
FIG. 1 shows an exploded view of the indicative seal according to the invention and the conventional wheel stud and nut to which the seal will engage.
Figure 2:
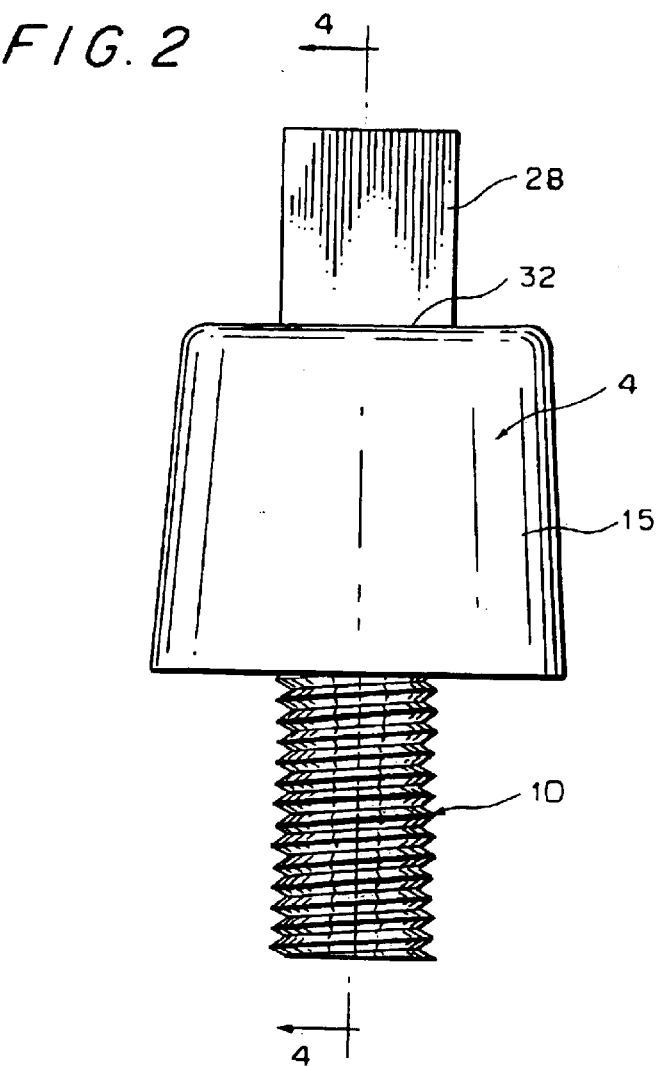
FIG. 2 is an elevation view of the indicative seal of FIG. 1 in combination with the wheel stud and nut.
Figure 3:
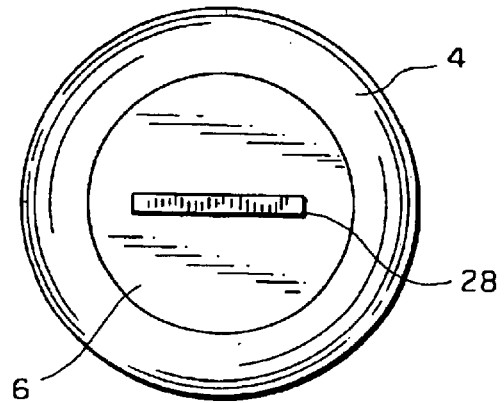
FIG. 3 is a top view of the indicative seal of FIG. 2.

As depicted in FIGS. 1–4, the present invention is an indicative seal assembly 1 consisting of three plastic parts: 1) a nut cover 2, 2) a cap 4, and 3) a stud nut 6.

The nut cover 2 has a hole 8 through which a conventional wheel stud 10 can be inserted and is shaped for corresponding engagement over a nut 12 on the wheel stud 10. Locking teeth 14 are formed to project up from the circumference of hole 8 of the nut cover 2.

The cap 4, which is to be engaged over the nut cover 2, has an outer wall 15 which can be conical and an inner tubular wall 16 extending down within the outer wall 15 from the circumference of a hole 17 in the top wall 19 of the cap 4. A circular ledge 18 at the bottom end of the inner tubular wall 16 projects in from the inner circumference of the tubular wall 16.

Figure 4:
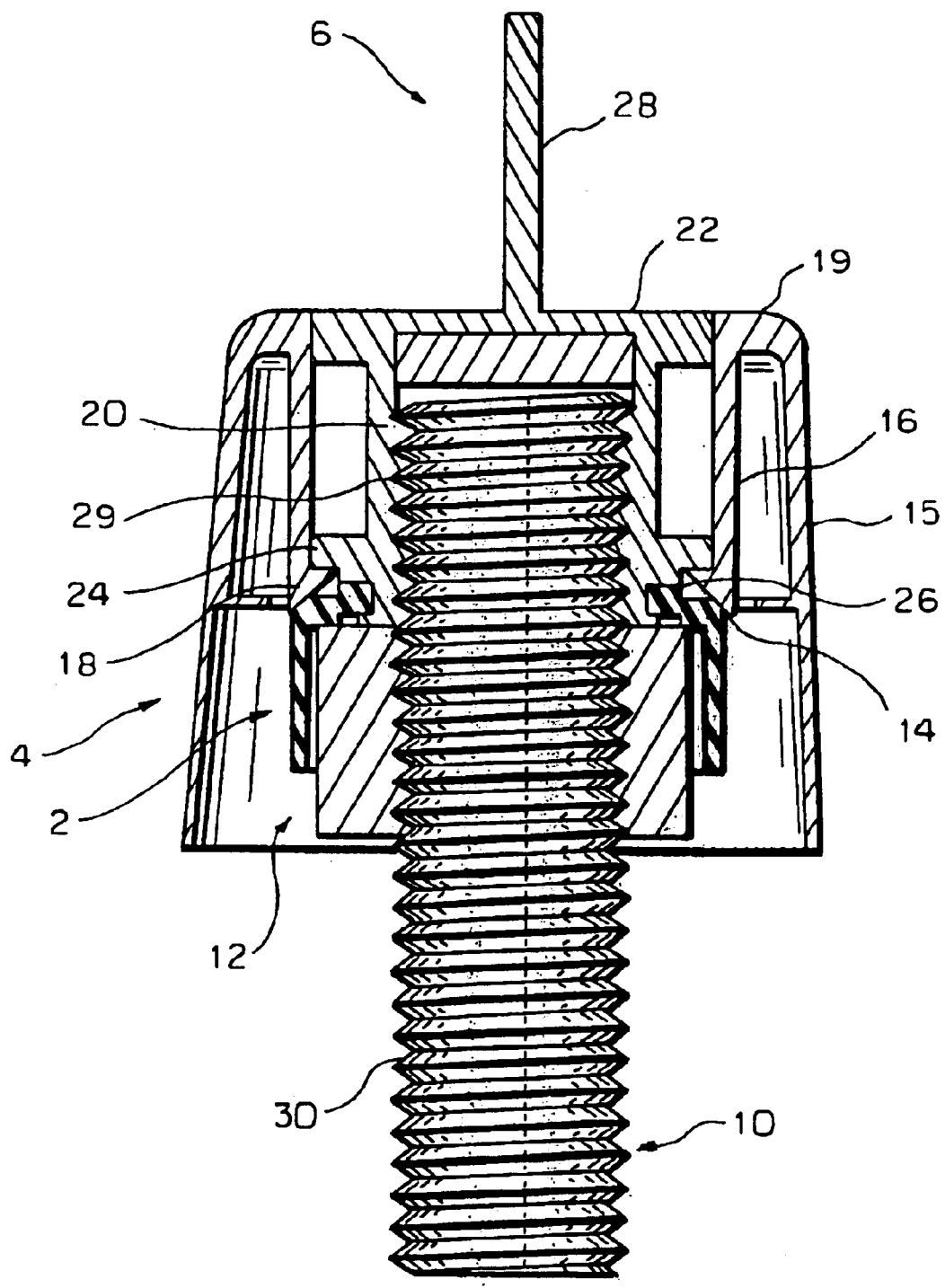
FIG. 4 is a cross-section along section line 4—4 of FIG. 2

The stud nut 6 has a tubular wall 20 extending down from a top wall 22 and a circular ledge 24 near the bottom end of the tubular body 20 that projects out from the outer circumference of the tubular body 20. Locking teeth 26 corresponding to locking teeth 14 of nut cover 2 are formed below ledge 24. The inside threads 29 on tubular body 20 allow the stud nut 6 to be threaded onto the threads 30 of the wheel stud 10 internally of the cap 4 so as to hold down the cap 4 against nut cover 2 when ledge 24 of the stud nut 6 engages ledge 18 of the cap 4. When the stud nut 6 is fully threaded onto the wheel stud 10, as shown in FIG. 4, by rotating the fitting wing 28, the locking teeth 26 of the stud nut 6 are also engaged with the locking teeth 14 on the nut cover 2.

When the stud nut 6 cannot be tighten any further on the wheel stud 10, additional twisting torque breaks the fitting wing 28 off at the scored or indented line 32 at the bottom of the fitting wing.

With the fitting wing 28 gone, the force required to back out the stud nut 6 would either shear the locking teeth 14, 26 on the nut cover 2 and stud nut 6 or break the nut cover 2. Since the cap 4 covers the stud nut 6 and the nut cover 2, it is not possible to grip the stud nut 6 with fingers or tools to back it out unless the cap 4 is broken. The cap 4 also freely turns between the stud nut 6 and nut cover 2, making it impossible to turn the stud nut 6 by squeezing and turning the cap 4. The design only requires a short thread on the wheel stud 10 above nut 12 and once the operator is able to twist the stud nut 6 until the fitting wing 28 breaks off, it is a certain and easy indication that the seal is fitted correctly and securely. The outer wall 15 of the cap 4 can be made to be transparent so that a user can attach stickers with seal numbers readable when the security seal assembly is fitted to the wheel stud, thereby alerting the user to any seal with different numbering that might be substituted.

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology or terminology employed herein is for the purpose of description and not of limitation.

What is claimed is:

1. An indicative seal assembly adapted to be engaged over a nut fastened on a wheel stud of a vehicle, the seal assembly comprising:

a nut cover shaped for corresponding engagement over the nut when the wheel stud is extended through a hole in the nut cover, the nut cover having first locking teeth;

a cap adapted to be engaged over the nut cover when the nut cover is engaged over the nut, the cap having an outer wall and a first tubular wall within the outer wall, the first tubular wall having a first ledge thereon; and a stud nut adapted to be engaged to the wheel stud and to the nut cover and cap when engaged to each other over the nut; the stud nut having a second tubular wall which has second locking teeth corresponding to the first locking teeth and a second ledge above the second locking teeth;

wherein the first and second locking teeth and the first and second ledge are in engagement within the outer wall of the cap when the stud nut is fully threaded on to the wheel stud.

2. The indicative seal according to claim 1, wherein the first ledge extends inward from the first tubular wall and the second ledge extends outward from the second tubular wall.

3. The indicative seal according to claim 1, wherein the first locking teeth project up from a top wall of the nut cover and the second locking teeth project down from a free end of the second tubular wall.

4. The indicative seal according to claim 1, wherein a diameter of the first tubular wall is greater than that of the second tubular wall creating a space between the first and second tubular wall when the cap and the stud nut are engaged together, the first and second ledge extending into the space.

5. An indicative seal according to claim 1, wherein the nut cover, the cap and the stud nut are all made from plastic.

6. An indicative seal according to claim 1, wherein the outer wall of the cap is conical and transparent.

7. An indicative seal according to claim 1, wherein the outer wall of the cap extends to a bottom of the nut when the nut cover, the cap and stud nut are fully engaged on the wheel stud.

8. An indicative seal according to claim 1, wherein the stud nut has a fitting wing on a top wall thereof for facilitating threading of the stud nut onto the wheel stud.

9. An indicative seal according to claim 8, wherein the fitting wing is scored at a joint between the fitting wing and the top wall of the stud nut so as to facilitate breaking the fitting wing off the top wall after the stud nut has been fully threaded on to the wheel stud.

10. An indicative seal according to claim 9, wherein the top wall of the stud nut is coplanar with a top wall of the cap after the fitting wing has been broken off.

11. An indicative seal according to claim 10, wherein a diameter of the top wall of the stud nut is substantially equal to an inner diameter of the second tubular wall.

12. An indicative seal according to claim 1, wherein the cap can be freely turned around the axis of the wheel stud when engaged between the stud nut and the nut cover fully engaged on the wheel stud.

13. An indicative seal according to claim 1, wherein the first tubular wall has internal threads corresponding to threads on the wheel stud.

* * * * *